(No Model.) 5 Sheets—Sheet 1.

J. McBRIDE, T. NAULTY & S. L. WIEGAND.
APPARATUS FOR UNLOADING RAILWAY CARS.

No. 563,939. Patented July 14, 1896.

WITNESSES
N. E. Paige
Sam. Wright

INVENTORS
John McBride
Thomas Naulty
S. Lloyd Wiegand

THE NORRIS PETERS CO., PHOTO-LITHO., WASHINGTON, D. C.

(No Model.) 5 Sheets—Sheet 3.

J. McBRIDE, T. NAULTY & S. L. WIEGAND.
APPARATUS FOR UNLOADING RAILWAY CARS.

No. 563,939. Patented July 14, 1896.

WITNESSES:
A. E. Paige
Sam. Wright

INVENTORS:
John McBride
Thomas Naulty
S. L. Wiegand

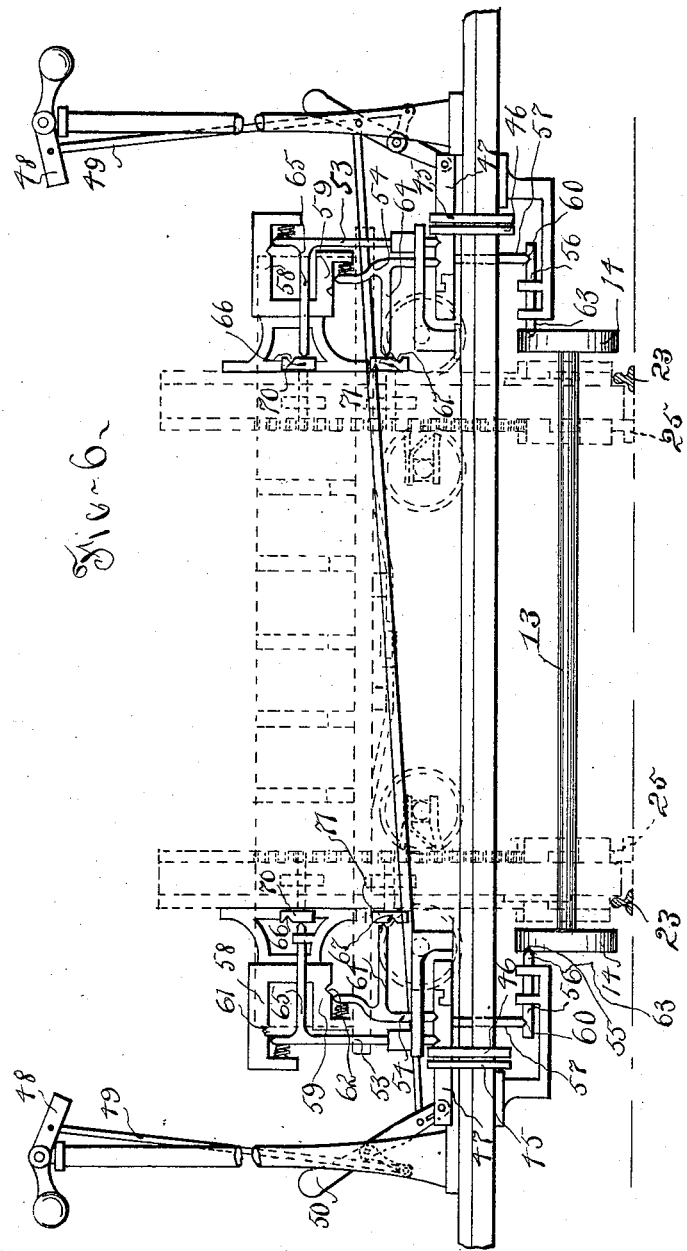

(No Model.) 5 Sheets—Sheet 5.
J. McBRIDE, T. NAULTY & S. L. WIEGAND.
APPARATUS FOR UNLOADING RAILWAY CARS.
No. 563,939. Patented July 14, 1896.
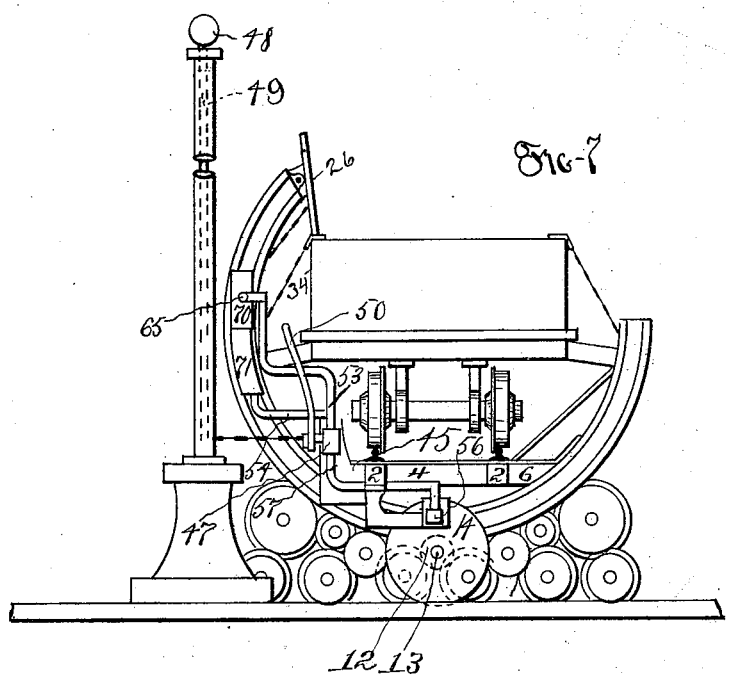
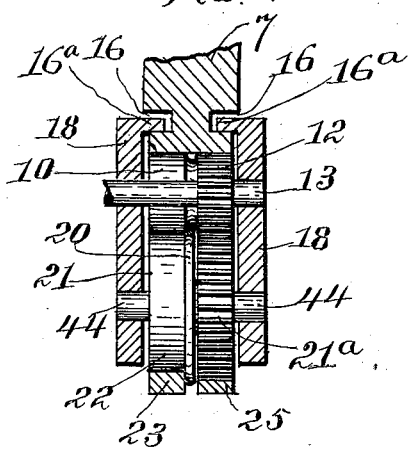
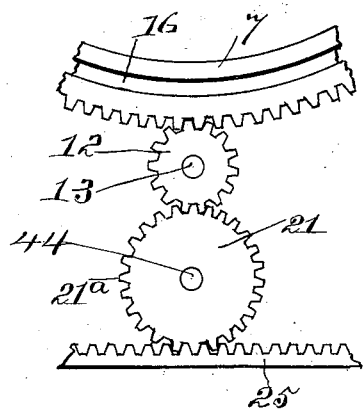
WITNESSES INVENTORS

UNITED STATES PATENT OFFICE.

JOHN McBRIDE, THOMAS NAULTY, AND S. LLOYD WIEGAND, OF PHILADELPHIA, PENNSYLVANIA; SAID NAULTY AND WIEGAND ASSIGNORS TO SAID McBRIDE.

APPARATUS FOR UNLOADING RAILWAY-CARS.

SPECIFICATION forming part of Letters Patent No. 563,939, dated July 14, 1896.

Application filed September 20, 1893. Serial No. 486,043. (No model.)

*To all whom it may concern:*

Be it known that we, JOHN McBRIDE, THOMAS NAULTY, and S. LLOYD WIEGAND, citizens of the United States, residing at Philadelphia, in the county of Philadelphia and State of Pennsylvania, have invented certain new and useful Improvements in Apparatus for Unloading Railway-Cars; and we do hereby declare the following to be a sufficiently full, clear, and exact description thereof as to enable others skilled in the art to make and use the said invention.

This invention relates to loading and unloading of railroad-cars, is referable to that class of such inventions designated as "tilting platforms," and has for its object the expeditious, safe, and easy unloading of commodities in bulk from railway-cars for purposes of transshipment or storage.

To accomplish these desiderata, this invention consists of a section of railway-track supported on rolling segments and wheels and supporting transverse rails, mechanism for securing the car to the section of track, a series of interlocking and signaling devices to prevent the opening of the track until the car is properly secured thereto, and mechanism whereby the track and car can be turned over and returned either by manual or other power, as hereinafter fully described, and shown in the accompanying drawings, in which—

Figure 1:
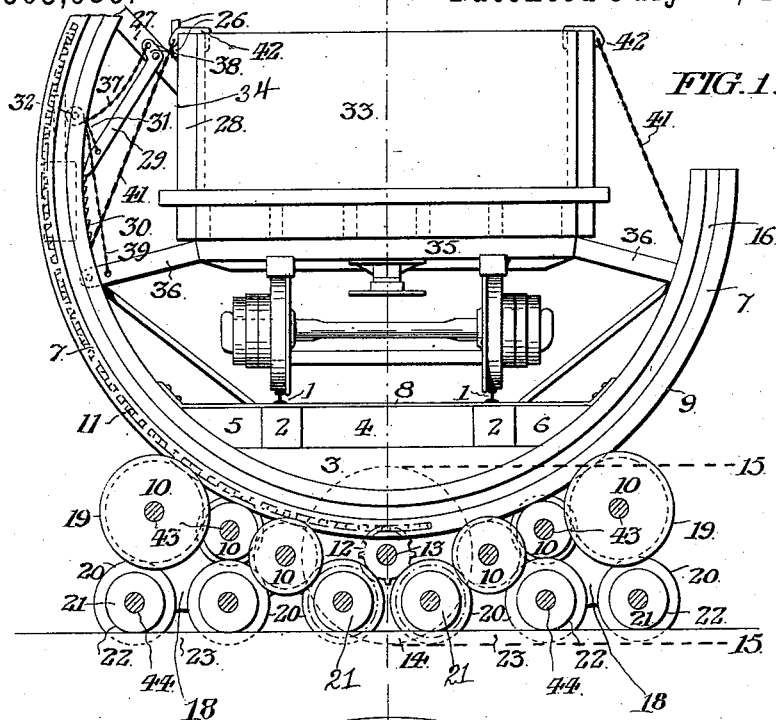
Figure 2:
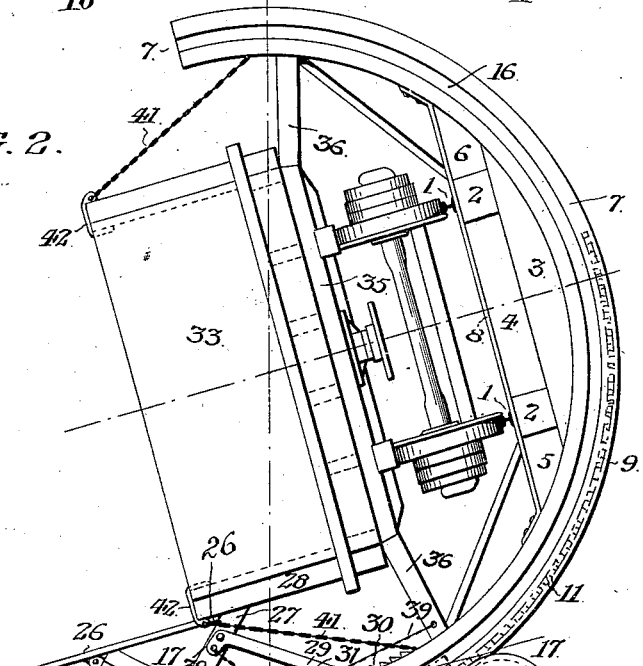
Figure 3:
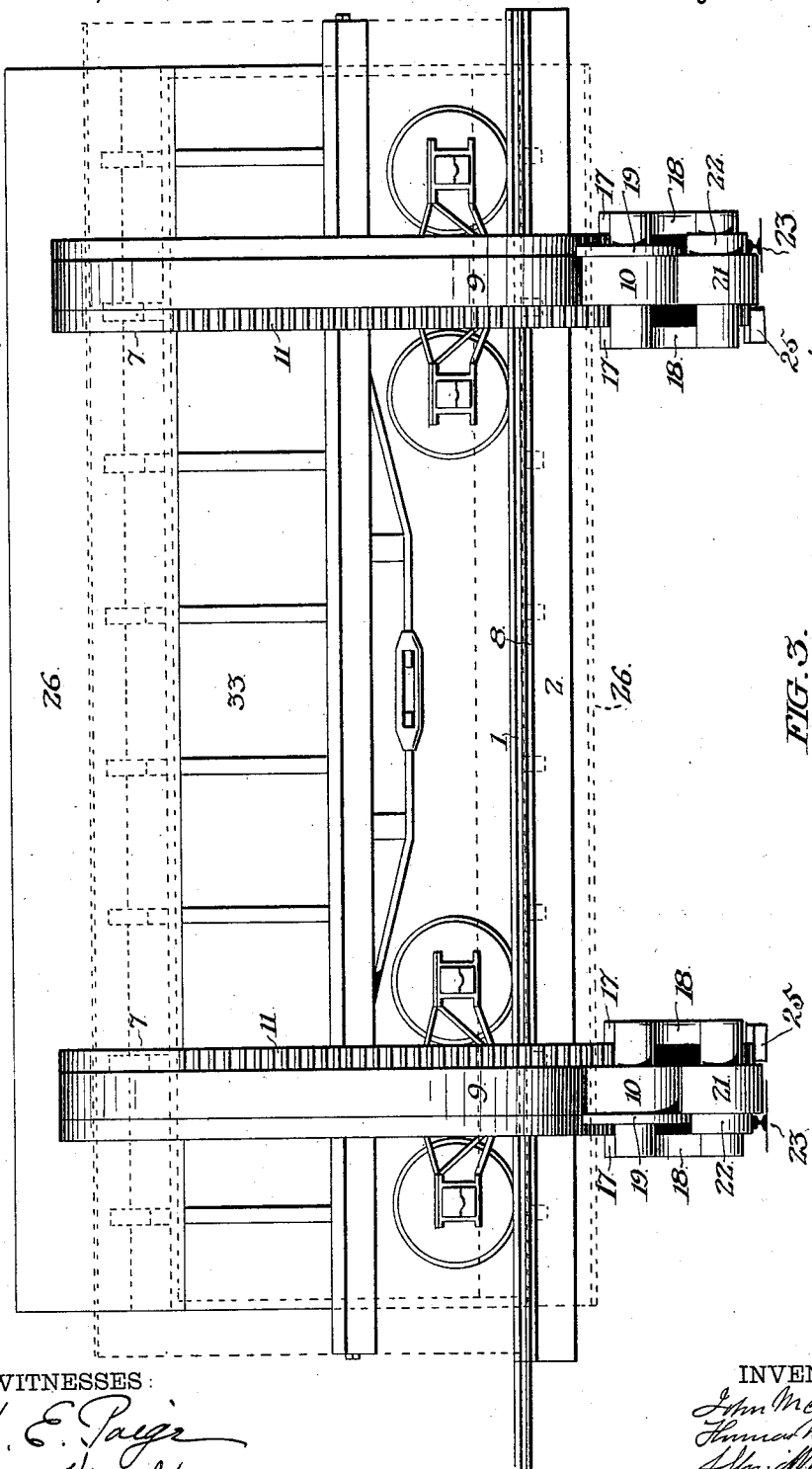
Figure 4:
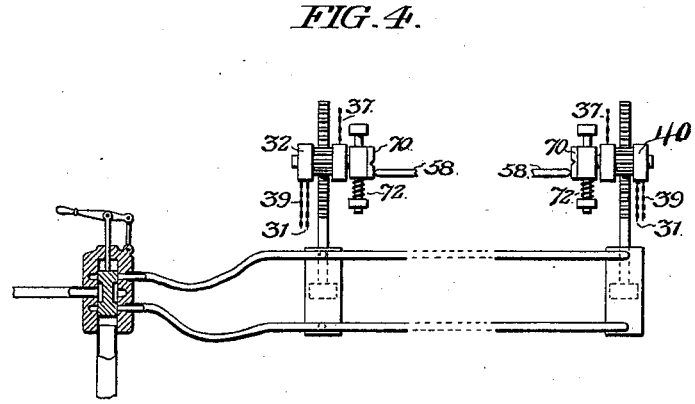
Figure 5:
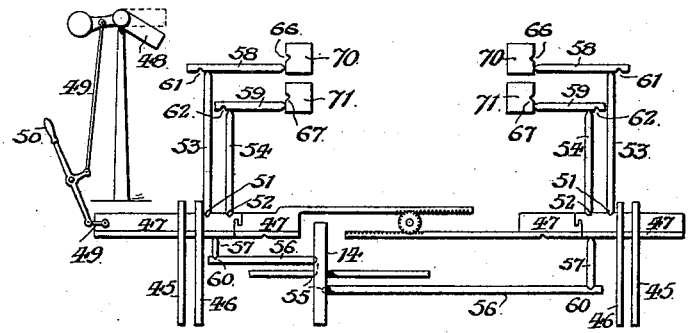
Figure 8:
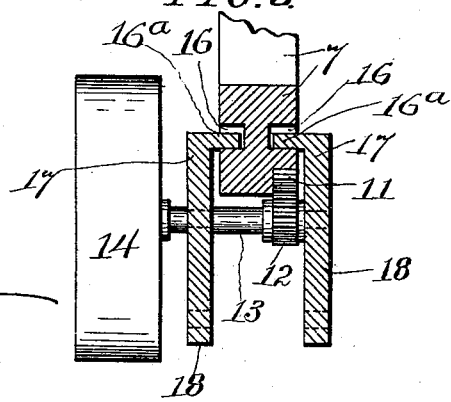

Figure 1 shows an end elevation of this invention with the car and track in normal position, with one side of the frames 18 removed, showing the roller-spindles in section. Fig. 2 is a similar view with the track and car turned over and the latter unloaded. Fig. 3 shows a side elevation thereof, in full lines as in normal position and in dotted lines as tilted and emptied. Fig. 4 shows a hydraulic windlass-operating mechanism. Fig. 5 shows a detached view of the interlocking signal and clamping mechanism. Fig. 6 shows a side elevation of a truck and operating mechanism in dotted lines, with the interlocking signal and clamping portions of the invention drawn in full lines. Fig. 7 shows an end elevation of the same parts. Fig. 8 is a sectional view of the frame 18, carrying the shaft and pinion and part of a segment, showing the projections of the frame engaging the grooves of the segment. Fig. 9 is a cross-section of the frame 18 and segment, showing the teeth of the wheels or rollers 21 engaging the rack 25. Fig. 10 is a side view of Fig. 9 with one side of the frame 18 removed.

1 1 represent the rails of a section of track forming either a part of a main or branch line, but preferably of a siding or turnout.

2 2 are lengthwise sills supporting the rails 1 1, which are firmly secured thereto in any usual manner.

3 3 are cross-ties supporting the sills 2 2, and 4, 5, and 6 blocks fitted upon the cross-ties 3 3 to the sills 2 2, bracing them firmly in position on the ties 3 3.

7 7 are segments of circular rings, into each of which one of the cross-ties 3 and the blocks 4, 5, and 6 and the sills 2 2 are fitted and firmly fastened. A plate 8, secured at each end to the segment 7 and interposed between the rails 1 1 and sills 2 2, serves to brace the segment 7 against spreading and also assists in holding the blocks 4, 5, and 6, sills 2 2, and rails 1 1 in position in the segment 7.

As shown in the drawings, two segments 7 are employed; but a greater number may be used. When two are used upon a platform for dumping eight-wheeled cars, they are each preferably located in or near the vertical plane of the axis upon which each of the car-trucks is pivoted to the car-body.

The segments 7 are formed with bearing-surfaces 9 upon their peripheries, adapted to roll smoothly on rollers 10, which support them.

A series of cogs or teeth 11 are formed on or fastened to each of the segments 7, which engage in a pinion 12 on a shaft 13, journaled in the frame 18, by which the segments 7 may be rotated. The shaft 13 turns both of the segments 7 simultaneously and is rotated by means of a wheel 14 and driving band or chain 15, propelled by hand or power gearing or hydraulic appliances.

In the sides of the segments 7 7 are grooves 16, into which fit loosely the tongue 16ª of the projection 17, secured strongly to or formed integral with the frames 18, which contain the bearings of the axles 43 of the rollers 10 and prevent the segments 7 from being lifted off from the rollers 10. (See Figs. 2 and 8.)

The rollers 10 are provided with flanges 19, which guide the segments 7 as they roll upon them, and also guide the rollers 10 on the rims or flanges 20 of supporting-wheels 21, on which they rest.

The rollers 10 have their axles 43 journaled in the sides of the frames 18. Said rollers are revolved by the movement of the segments upon them, and the flanges 19 of the rollers 10 guide the segments as they roll upon the rollers 10, and also guide said rollers between the flanges 20 of the wheels 21, the axles 44 of the latter being journaled in the sides of the frame 18, so that the rollers 21 and 10 mesh with each other, and the tread 22 of the rollers 21 is upon a suitable rail 23. The wheels 21 have cogs or teeth 21$^a$, which mesh with the pinion 12 and the rack 25 to move the frame 18 horizontally in accordance with the circular movement of the segment.

It will be observed that the weight of the track, of the car, of the segments 7 7, and of the connected tilting parts is supported by rolling contact of the wheels, treads, or faces 22, rails 23, wheels 21, rollers 10, and segment 7, so that the pivots or axles 43 and 44 of the wheels 21 and rollers 10 are subjected only to the pressure and friction incident to the stress on the frames 18, holding them in place laterally, and whatever force is applied in tilting the platform and load thus mounted on a rolling support, and in progressing it sidewise on the rails 23.

In order to prevent the sides of the car from spreading, a hinged shelf 26, extending the length of the car, is attached to the segments 7, at the upper ends, which being pressed and held upward against the side 34 of the car-body 33, by means hereinafter stated, serves to direct the contents of the car when tilted to pass clear of the wheels 21, racks 25, and rollers 10, as well as to brace the sides of the car when the latter is subjected to the weight of the load in such lifted position. (See Fig. 2.) Below the points of attachment of the shelf 26 to the segment 7 braces 27 are pivotally attached to the segment 7, which, when raised, press against the stanchion 28 of the car-body, and are held up in position by a pawl 29, pivotally attached thereto, engaging in a rack 30, secured to the segment 7. The pawls 29 and braces 27 are raised by chains 31, attached to the pawls 29, and wound in a windlass 32. In their rising movement the braces 27 engage the lower edge of the shelf 26 and push the latter into contact with the upper part of the side 34 of the car-body. To disengage the braces 27 from the stanchion 28, the windlass 32 is turned in the opposite direction to that which causes the brace to engage the stanchion, and the chains 37, attached to lever-arms 38 and to the windlass, pull the pawl 29 out of the rack 30, whereupon the inner end of the lever 27 will drop from the stanchion 28.

Below the point of attachment of each of the braces 27 on each stanchion 28 and opposite the position of the bolster-beams 35 of the car-body 33 is pivotally attached another brace 36, which steadies the car-body in the segment 7. These braces are raised into position by the chains 39 winding on the windlass 32, and are retracted by gravitation when the motion of the windlass 32 is reversed. Chains 41 reach from the segments to hooks 42, which fit over the upper edge of the car 33 and serve to hold the car securely to the track.

The windlass 32 may be turned by hand or by means of pistons operated by hydraulic pressure, the latter being preferable because the distribution of force is more equal.

The arrangement for operating the windlass 32 by hydraulic apparatus is shown in Fig. 4. A like construction of apparatus is applicable to the windlass 40.

In order to guard against accident from prematurely tilting the car before properly securing it to the track, an interlocking and detecting mechanism is applied to the moving or tilting section of track. This is shown in detached views in Figs. 5, 6, and 7, and consists of a plate 45, fastened to each of the ends of stationary rails where they are interrupted by the tilting section. A corresponding plate 46 is secured to the ends of the sills 2 2. Slide-bars 47, fitted in the plate 45, slide through openings or cavities in the plates 46, which slide-bars 47 are attached to signals 48 by rods 49, and are operated by hand through a lever 50, and can only enter the plate 46 when the rails 1 1 are in register with those of the line. The part of each slide-bar 47 which extends through the plate 46 has transverse V-shaped notches 51 and 52 made in the side, into which the correspondingly-shaped ends of sliding bars or rods 53 and 54 fit and hold the slide-bars 47, so that it cannot be retracted from the plate 46 until the ends of the rods 53 and 54 are both withdrawn from the notches 51 and 52. A series of notches 55 is formed in the wheel 14, into which a sliding bar 56 interlocks and prevents rotation until it is withdrawn. The bars 56, 54, and 53 are respectively made of such lengths as to bear against rods 57, 59, and 58, which hold said bars 56 engaged in the notches 55 in the wheel 14, and rods 58 and 59 keep bars 53 and 54 in the notches 51 and 52 in the slide-bar 47. The ends of the bars 57, 54, and 53 are beveled where they bear against the rods 56, 58, and 59, so as to enter into transverse V-shaped notches 60, 61, and 62, formed in the sides of the rods 56, 58, and 59, which notches are so located in the rods 56, 58, and 59 as to come opposite the beveled ends of the bars 57, 54, and 53 when bolts 63, 64, and 65, respectively, attached to the rods 56, 54, and 53, enter notches 66 and 67 in bearings 70 and 71 of the windlasses 32 and the notch 55 in the wheel 14, which notches will only register with the bolts when the windlasses are under a stress sufficient to clamp the car firmly in the segments 7 and against the track 1 1, and the several braces 27 are raised into position to press against the bolster-beams 35 of the car-body 33.

The bearings 70 and 71 of each windlass are set upon an elastic or spring support 72, which must be compressed with a force commensurate with secure clamping of the car before the apertures 66 and 67 can register with the bolts 64 and 65, so that the operator cannot turn the wheel 14 and tilt the track-section and car until it is completely secured and the danger-signal set on the line and cannot open the signal to "safety" until the tilting section is again locked in safe closed position in the line.

When the signal is set for "danger" and the car firmly clamped in position, as described, the wheel 14 is turned and the section of track included in the tilting mechanism rolls over into the position indicated in Fig. 2 and in the dotted portion of Fig. 3. At the same time the wheels 21 turning cause their treads 22 to progress sidewise on the tracks 23 and bring the side 34 of the car-body 33 and shelf 26 into position to deliver the contents of the car, clear of the track, into such a chute or storage-chamber as may be below prepared for it.

The axis of the segments 7 is located slightly below the axial line of the center of gravity of the tilting section and the car and the load combined, and above the axial line of the center of gravity of the tilting section and the empty car, so that when a loaded car is placed upon the tilting section, and is properly secured thereon in the manner hereinbefore described, and liberated from the fixed sections, the weight of the load assists in tilting the section and propelling it sidewise on the tracks 23, so as to discharge the load beyond the side of the line of the road, and after the discharge of the load the weight of the car assists in returning the tilting section of track and the empty car to its normal position in the line of the road.

It is obvious that by changing the relative diameters of the wheel-rims 20 and treads 21 and the tooth-propelling gear therewith connected that the relative extent of side motion and tilting can be varied, and by applying the bracing and clamping devices to both sides of the apparatus it may be worked so as to tilt and discharge on either side.

Having described our invention and the operation thereof, what we claim as new is—

1. In a tilting platform for unloading railroad-cars, a section of line-track, segments secured thereto as described and rollers supporting said segments, in combination with transverse tracks, with wheels supporting said rollers upon said transverse track, and toothed gearing as described for imparting motion to said segments, rollers and wheels, substantially as set forth.

2. In a tilting platform for unloading railway-cars, the section of line-track, the segments supporting the same the rollers and wheels, and toothed gearing for tilting the platform, in combination with a hinged shelf, adapted to brace the side or sides of a railway-car, and direct the discharge of load therefrom, substantially as described and shown.

3. In a tilting platform for unloading railway-cars, a section of line-track, segments supporting the same, rollers and wheels supporting the segments, and clamping and bracing mechanisms, substantially as described, in combination with plates attached to the main track, and the tilting section, bolts engaging in cavities in said plates, and interlocking bars, connected with and controlled by the clamping and bracing devices, substantially as set forth.

4. In a tilting platform for unloading railway-cars, a section of track supported on rocking or rolling segments, clamping and bracing mechanism adapted to hold and support cars therein, in combination with plates attached to said section and having apertures therein, stationary plates, notched bolts in said stationary plates registering with the apertures of the plates of the rocking section, signal-vanes, connected with said bolts, and rods interlocking between the notches of said bolts and the clamping and bracing mechanisms substantially as set forth.

JOHN McBRIDE.
THOS. NAULTY.
S. LLOYD WIEGAND.

Witnesses:
CYRUS R. MORGAN,
EMMA DIBSDALE.